United States Patent
Wu et al.

(10) Patent No.: US 7,818,330 B2
(45) Date of Patent: Oct. 19, 2010

(54) BLOCK TRACKING MECHANISM FOR WEB PERSONALIZATION

(75) Inventors: Min Wu, Beijing (CN); Chenxi Lin, Beijing (CN); Benyu Zhang, Beijing (CN); Huajun Zeng, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/801,404

(22) Filed: May 9, 2007

(65) Prior Publication Data

US 2008/0281834 A1    Nov. 13, 2008

(51) Int. Cl.
G06F 7/00    (2006.01)
(52) U.S. Cl. .................. 707/755; 707/709; 707/796; 707/797; 715/760; 715/864; 709/207; 709/217; 709/218; 709/219
(58) Field of Classification Search ................ 707/2–4, 707/10, 100–102, 104.1, 755, 709, 796, 797; 715/760, 864; 709/207, 217–219
See application file for complete search history.

(56) References Cited

U.S. PATENT DOCUMENTS

| | | | |
|---|---|---|---|
| 6,035,332 A | 3/2000 | Ingrassia, Jr. et al. | |
| 6,182,072 B1 * | 1/2001 | Leak et al. | 707/10 |
| 6,766,329 B1 | 7/2004 | Nicholson | |
| 6,976,210 B1 * | 12/2005 | Silva et al. | 715/205 |
| 6,993,520 B2 | 1/2006 | Doyle et al. | |
| 6,993,531 B1 * | 1/2006 | Naas | 707/102 |
| 7,058,892 B1 | 6/2006 | MacNaughton et al. | |
| 7,143,365 B2 | 11/2006 | Gallella | |
| 7,200,804 B1 * | 4/2007 | Khavari et al. | 715/230 |
| 2002/0059166 A1 | 5/2002 | Wang et al. | |
| 2006/0123042 A1 | 6/2006 | Xie et al. | |
| 2006/0224997 A1 | 10/2006 | Wong et al. | |

(Continued)

FOREIGN PATENT DOCUMENTS

| | | |
|---|---|---|
| KR | 10-2000-0058779 A | 10/2000 |
| KR | 10-2006-0036692 A | 5/2006 |
| WO | WO-2006/001641 A1 | 1/2006 |

OTHER PUBLICATIONS

"WISDOM: Web Intra-page informative Structure Mining based on Document Object Model"—Kao et al. IEEE Transactions on Knowledge, cscl.iis.sinica.edu.tw, 2005 IEEE (pp. 1-37).*

(Continued)

*Primary Examiner*—John E Breene
*Assistant Examiner*—Anh Ly

(57) ABSTRACT

Described is a technology by which blocks of web pages may be selected, such as for building a user-personalized web page containing selected blocks. A selection mechanism, such as a browser toolbar add-on, provides a user interface for selecting blocks, and records information about selected blocks. A block tracking mechanism (e.g., a daemon program) uses the information to locate selected blocks of the web pages, including when the web page containing the block is updated with respect to content and/or layout. The block tracking mechanism may update a local gadget that when invoked, such as by browsing to a particular web page, which shows updated versions of the block on a personalized web page. Blocks may be efficiently located by processing trees representing web pages into reduced trees, and then by performing a minimum distance mapping algorithm on the reduced trees.

14 Claims, 11 Drawing Sheets

U.S. PATENT DOCUMENTS

| | | |
|---|---|---|
| 2006/0229985 A1 | 10/2006 | Lalwani et al. |
| 2006/0271834 A1 | 11/2006 | Wang et al. |
| 2007/0143672 A1* | 6/2007 | Lipton et al. ................ 715/530 |
| 2007/0180380 A1* | 8/2007 | Khavari et al. .............. 715/704 |
| 2007/0208751 A1* | 9/2007 | Cowan et al. ................. 707/10 |
| 2007/0294646 A1* | 12/2007 | Timmons .................... 715/864 |
| 2008/0091663 A1* | 4/2008 | Inala et al. ..................... 707/3 |
| 2008/0133500 A1* | 6/2008 | Edwards et al. ............... 707/5 |
| 2008/0215997 A1* | 9/2008 | Wu et al. .................... 715/760 |

OTHER PUBLICATIONS

"Web page fragmentation and content manipulation for constructing personalized portals"—Ioannis et al.—Spring Berlin/Heidelberg vol. 3007/2004, Mar. 15, 2004 (pp. 744-754).*

"Web Page Tracking Service WatchThatPage Adds Powerful New Features", Date: Aug. 8, 2002, http://www.urlwire.com/news/080802a.html.

* cited by examiner

BLOCK TRACKING MECHANISM FOR WEB PERSONALIZATION

BACKGROUND

Web users often save shortcuts to their pages on the web for convenient reuse. A conventional way to save shortcuts is to use one or more "Favorites" folders to organize URLs of interest for quickly locating the page. Some tools have been developed to help users organize their shortcuts.

Many users may only be interested in a part of a web page instead of the whole page. For example, personalized homepage applications enable web users to select web content of interest and to customize layouts and visual styles, such as to show customized stock prices, weather, searches and email messages.

However, it is a complex matter to define such content of interest and to maintain the information in it. Service providers often analyze the behavior of large quantities of users to get some information of interest. Intensive efforts are then involved to organize the information. Moreover, some information such as news and blogs is often frequently updated, which make the maintenance of such content blocks difficult.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a block selection mechanism provides a user interface for selecting a block of a web page, for which information is recorded when selected. A block tracking mechanism locates the selected block on the web page based on the information, including when the block is updated on an updated version of the web page with respect to content or layout, or both content and layout.

In one example, the block selection mechanism may be activated in response to user interaction with a browser toolbar, and the block tracking mechanism comprises a daemon program that automatically tracks the selected block. For example, the block tracking mechanism may update a gadget comprising a local component on a user computing device, and when the gadget is invoked, such as by browsing to a particular web page, an updated version of the block may be shown on a personalized web page containing the selected block.

In one example, the information corresponding to a selected block of a web page is recorded and used to track the selected block for updates, including locating the block. This may be accomplished by processing a data structure corresponding to an updated version of a web page and a data structure corresponding to a previous version of the web page. For example, the updated web page may be parsed into a data structure (e.g., domain object model tree), and transformed into a labeled tree. The labeled tree may then be processed to find fix nodes (nodes with both a tag and attributes that are immutable in the two trees), and the fix nodes pruned from the trees to generate reduce trees. The block may be located by performing a minimum distance mapping algorithm on the reduced trees.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards the collection of selected web content blocks from existing web pages by web users. A user's collected web blocks may be organized into a single personalized homepage. One example system and method described herein displays the collected web blocks, and tracks the blocks so as to automatically update their content based on changes to the corresponding web pages.

As will be understood, some of the examples herein are directed towards an example implementation in which users may employ a gadget, comprising a small software program, to arrange different kinds of web page blocks on a single page. In the examples, the gadget operates in conjunction with a block tracking mechanism that tracks the content blocks on web pages.

However, as will be understood, the various aspects of the technology described herein are independent of any particular components. Indeed, any component or set of components may employ the mechanisms described herein. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and web content processing in general.

Figure 1:
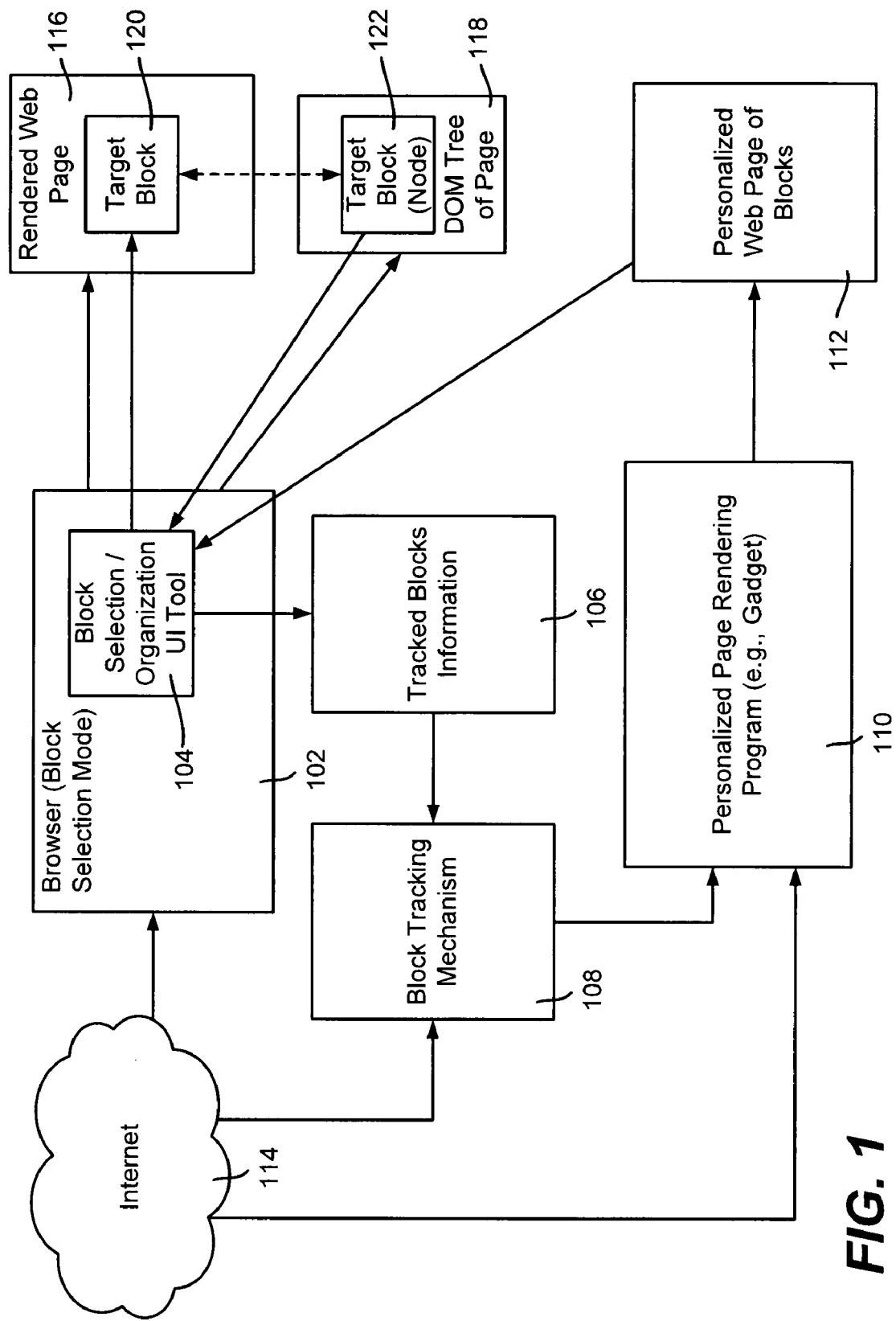
FIG. 1 is a block diagram representing an example system for allowing a user to select a web page block for inclusion in a personalized page, and for tracking the block to update it on the personalized page.

Turning to FIG. 1, there is shown an example system in which a user may construct a personalized homepage comprising a set of automatically updating blocks selected by the user. In general, a browser component 102 (e.g., of an operating system) includes a block selection and/or organization user interface (UI) tool 104. For example, a browser toolbar may be used to enable the tool 104 that allows a user to select a web page block. The tool records information 106 about the tracked block or blocks for a block tracking mechanism 108 (e.g., a daemon program) to track, including automatic tracking in one example.

For example, in one implementation, the block tracking mechanism 108 comprises a daemon program which tracks web page blocks according to the information recorded by the browser toolbar tool 104; whenever the block tracking mechanism 108 finds a change, it updates a personalized page rendering program 110 (e.g., a gadget comprising "url.html" and "block.html" pages of an internet information service) as described below. Then, when the personalized page rendering program 110 is triggered in some way, such as by visiting a particular website (e.g., http://www.live.com), the personalized page rendering program 110 is responsible for showing the tracked block or blocks in a personalized page 112.

Figure 2:
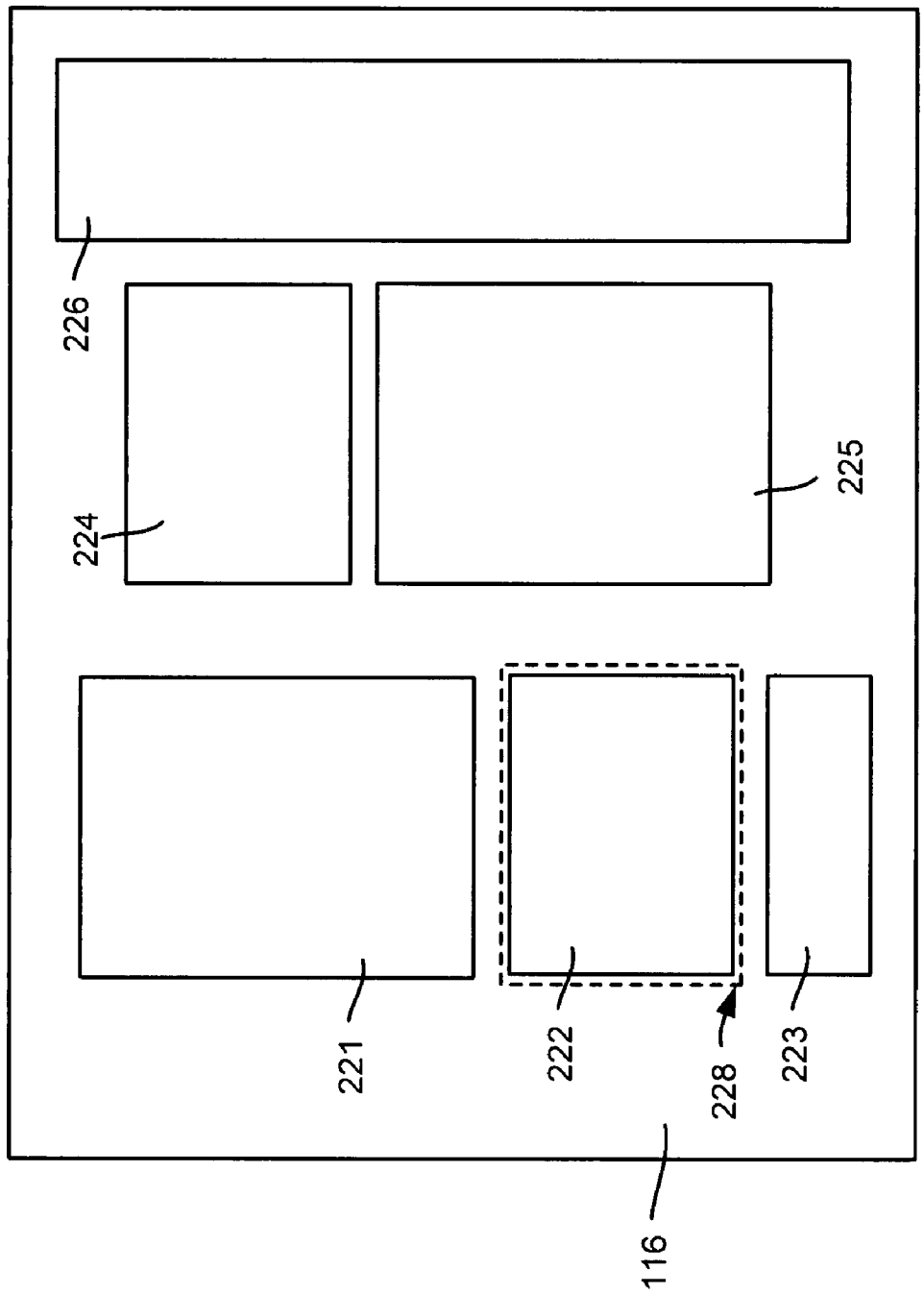
FIGS. 2-4 are representations of an example web page having a selectable block corresponding to a set of at least one node for inclusion in a personalized page.

As generally represented in FIG. 2, a web page 112 may be partitioned into multiple semantically coherent blocks; in FIG. 2, six such blocks are shown, labeled 221-226, but as can be readily appreciated, any practical number may be present. These blocks may be automatically recognized, such as by the browser component 102, as described below. In a block selection mode, the user may then select a block, such as by providing the user with the user interface tool 104 to select the blocks of interest, such as by pointer (e.g., mouse) operations.

For example, to collect the blocks, a manual block marking tool may be provided as part of the user interface tool 104. When browsing the Internet 114, a web page 116 is rendered and also parsed into a DOM (domain object model) tree 118. Each content block (e.g., 120) in the web page is mapped to a node (e.g., 122) that represents that block in the DOM tree 118. In general, while the user uses the tool 104 to interact with the rendered web page 116 to select a block (corresponding to one or more nodes in the tree), the tool 104 navigates the corresponding nodes in the DOM tree 118.

In one example, the tool 104 enables the user to target a block for selection, such as by operating a pointing device in various ways to interact with the rendered web age 116. For example, the user may control a mouse (e.g., move a cursor) relative to the rendered web page to target a block, with the targeted block visibly indicated as marked in some way, e.g., marked by a red rectangle; (note that as represented in the black-and-white image of FIGS. 2-4, the targeted block (corresponding to a node or set of nodes) is marked by a dashed rectangle 228).

Figure 3:
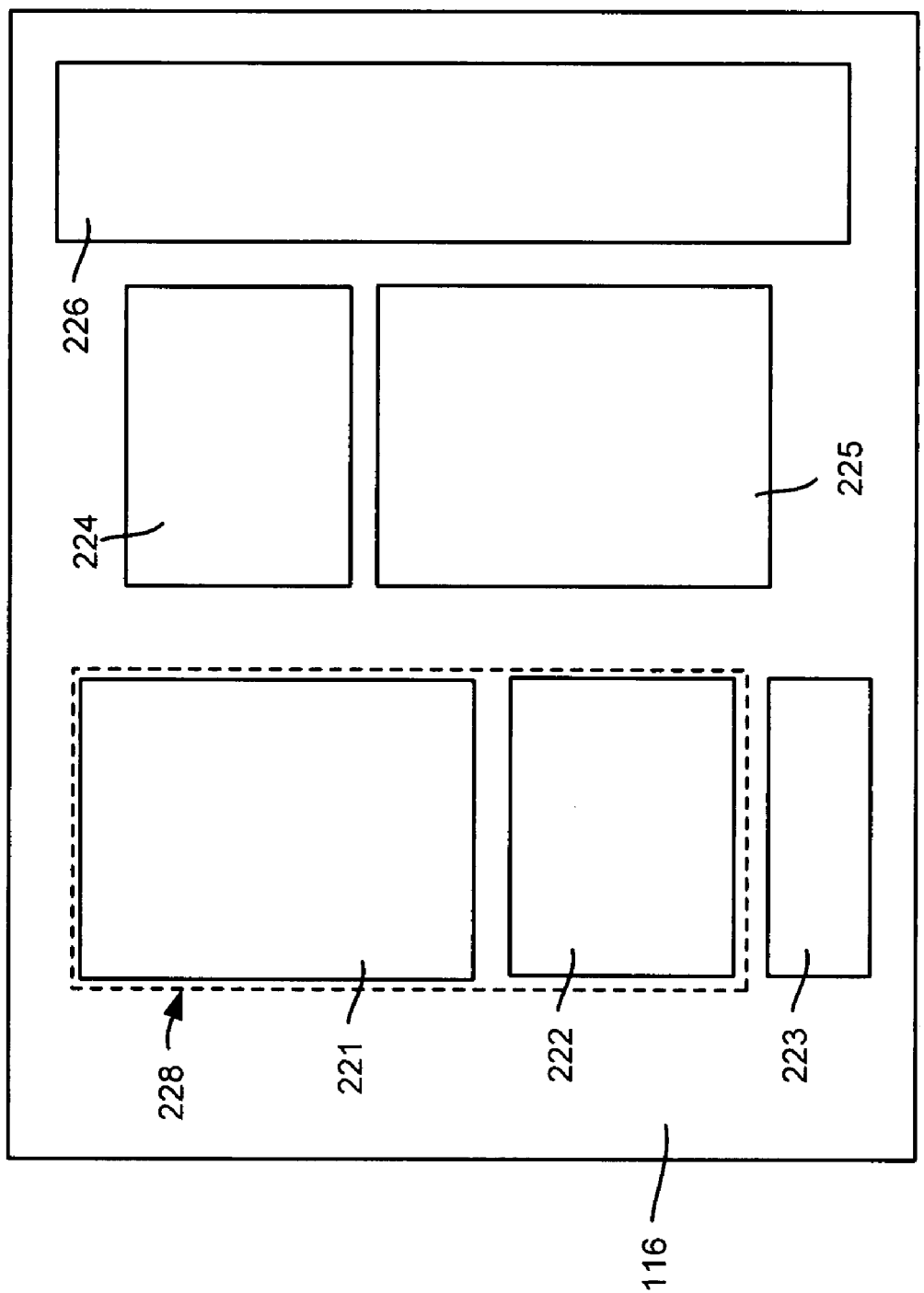
Figure 4:
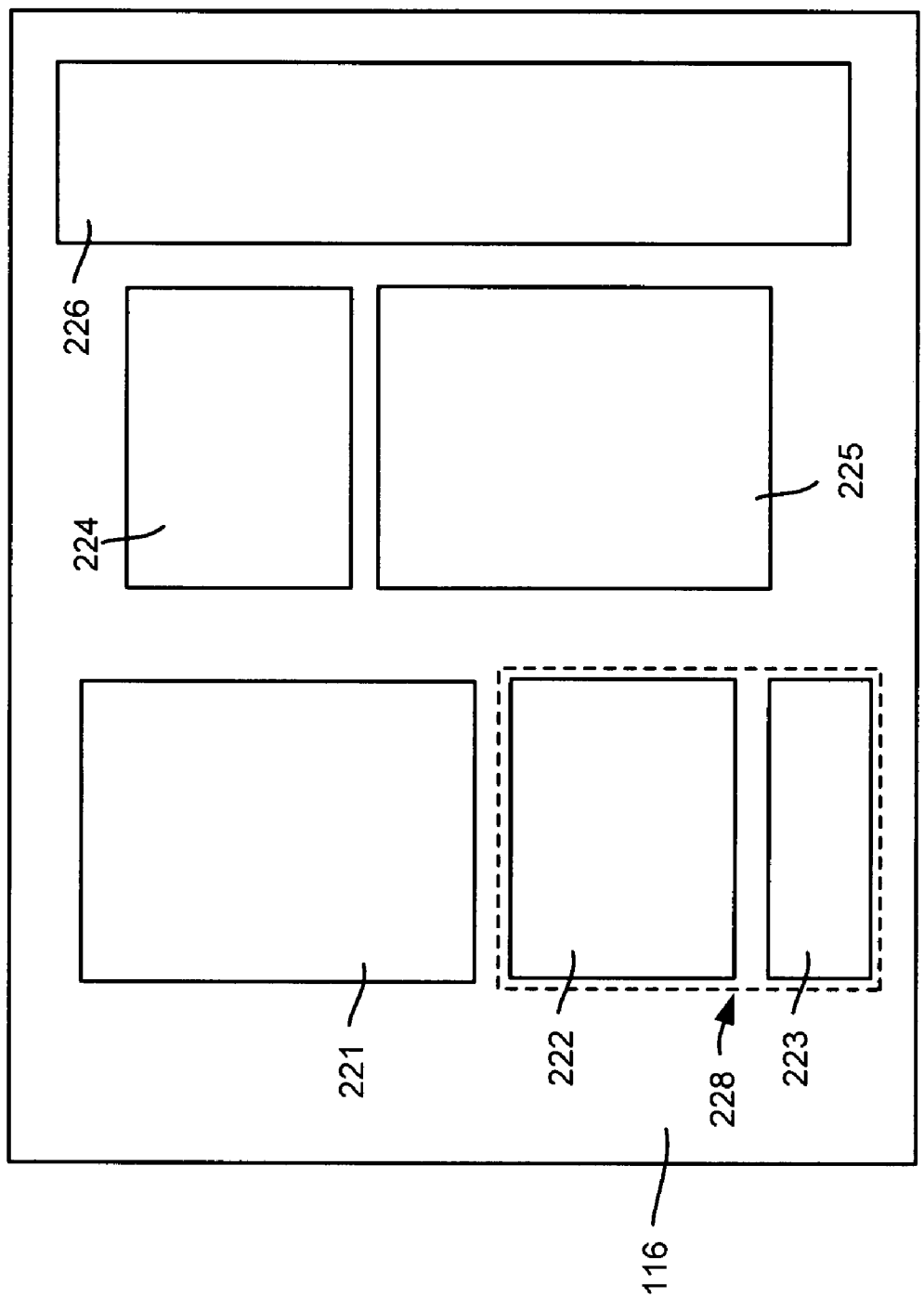

As represented in FIGS. 2-4, alternatively (or in addition to) basic block selection, the user can scroll a mouse wheel or the like to change the granularity of the targeted block. For example, an up-scroll may include the parent node in the corresponding target block (FIG. 3), and thus include the selected child under the current cursor and its parent in the block, while a down-scroll makes the block under the current cursor and its child node the target block (FIG. 4).

Figure 5:
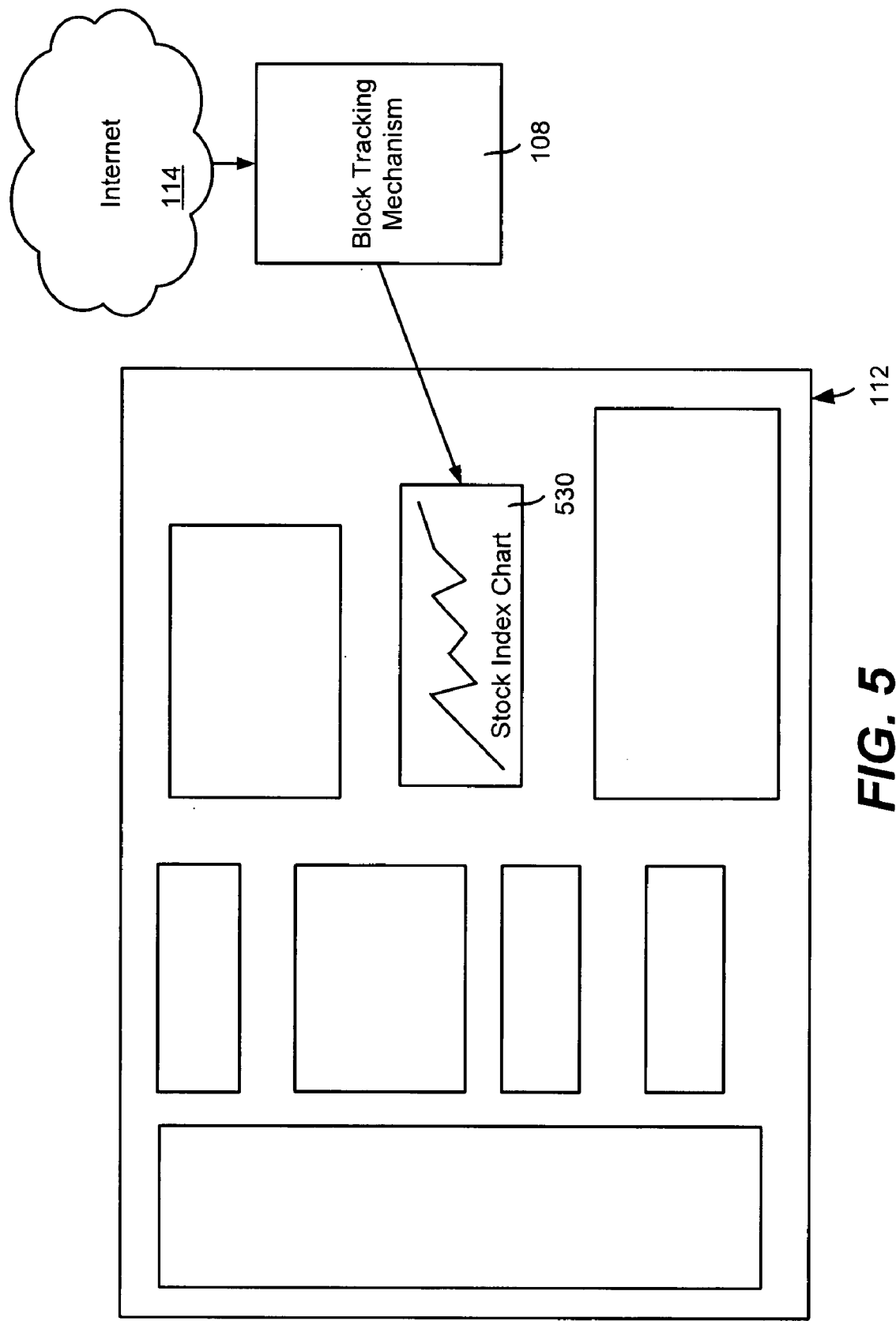
FIG. 5 is a representation of an example personalized page including an updated block that was tracked.

After the target block is confirmed for selection, e.g., by double-clicking the mouse, the user can drag or otherwise enter the selected block into a representation of the personalized page 112 (FIG. 5). The user may also organize the layout and the visual style of the personalized page 112, e.g., by dragging-and-dropping, moving blocks, possibly resizing blocks, and/or the like. The same tool 104 may be used for organization, although as can be readily appreciated, separate tools for selection and organization may be provided. A user may have any practical number of personalized pages.

In one example implementation, a website allows users to display the blocks that were collected and organized from different web pages in a single rendering comprising the personalized page 112. For example, a user may visit a web page (e.g., "Homepage Live") that is composed of the user's blocks from different sites. In contrast to identifying a web page via its URL, the system provides a way for users to mark web page blocks. The system helps users outline the blocks they want from web pages, and tracks them.

As described below, when a user re-opens the system, the system automatically accesses these web pages, detects the blocks' positions in the pages by an efficient block tracking mechanism 108, and presents extracted real time content to the user. For example, the block tracking mechanism 108 analyzes the original pages and the new pages. The block tracking mechanism 108 may detect new block positions in the updated pages, and present the extracted new blocks to the user. By way of example as represented in FIG. 5, if the user is only interested in part of a page corresponding to a stock index chart block 530, the block tracking mechanism 108 will fetch the page and show the latest chart 530 as part of the personalized home page 112, along with other previously selected blocks, which are also updated if they have changed.

Turning to the various aspects related to tracking content blocks, such tracking is a challenging problem because web pages may be frequently updated. For example, a news portal may be updated on an average of once every half hour. Moreover, not only may content be changed (inserted and/or removed), but the layout of the web page may also change frequently.

Thus, to track the block, the block tracking mechanism 108 needs to do more than simply record the visual position and size of the block, because content and layout may be changed. More particularly, given a web page and a user's target block, a corresponding block needs to be located in the modified page, where "corresponding block" refers to a relationship between the users' target block in the changed page and its original version.

In one example implementation, the Web page DOM (domain object model) tree structure 118 is used to track each selected block. By parsing a web page into a DOM tree 118, each block to be tracked is represented as a sub-tree. In this manner, the block tracking mechanism 108 identifies a certain sub-tree in any updated DOM tree for a new page. When the pages are updated, the block tracking mechanism 108 automatically locates the marked blocks and may show the new version to the users.

One way to identify a particular block within a DOM tree is by comparing the sub-trees, one by one, through a generalized tree edit distance algorithm. However, note that the time complexity of such an algorithm is $O(N^2 D^2)$, where N is the node number of the whole tree and D is the maximum child number of nodes in the whole tree. It is thus very time-consuming to trace several blocks simultaneously, particularly when blocks from some very large web pages are being tracked.

However, because the technology described herein tracks each block in sequential web pages, there may be some nodes with unchanged attributes, which may be leveraged to provide more efficient identification. To this end, an enhanced edit distance algorithm utilizes such information.

More particularly, nodes having their attributes in two sequential trees are indexed, with a fast matching algorithm used to find common nodes in the two trees. The two trees are then pruned into reduced trees, and a tree edit distance applied algorithm on the reduced trees. The time cost for such a mechanism is $O(N \log N + N'^2 D'^2)$, in which N' and D' are (in general) significantly smaller than the original N and D set forth above.

Figure 6:
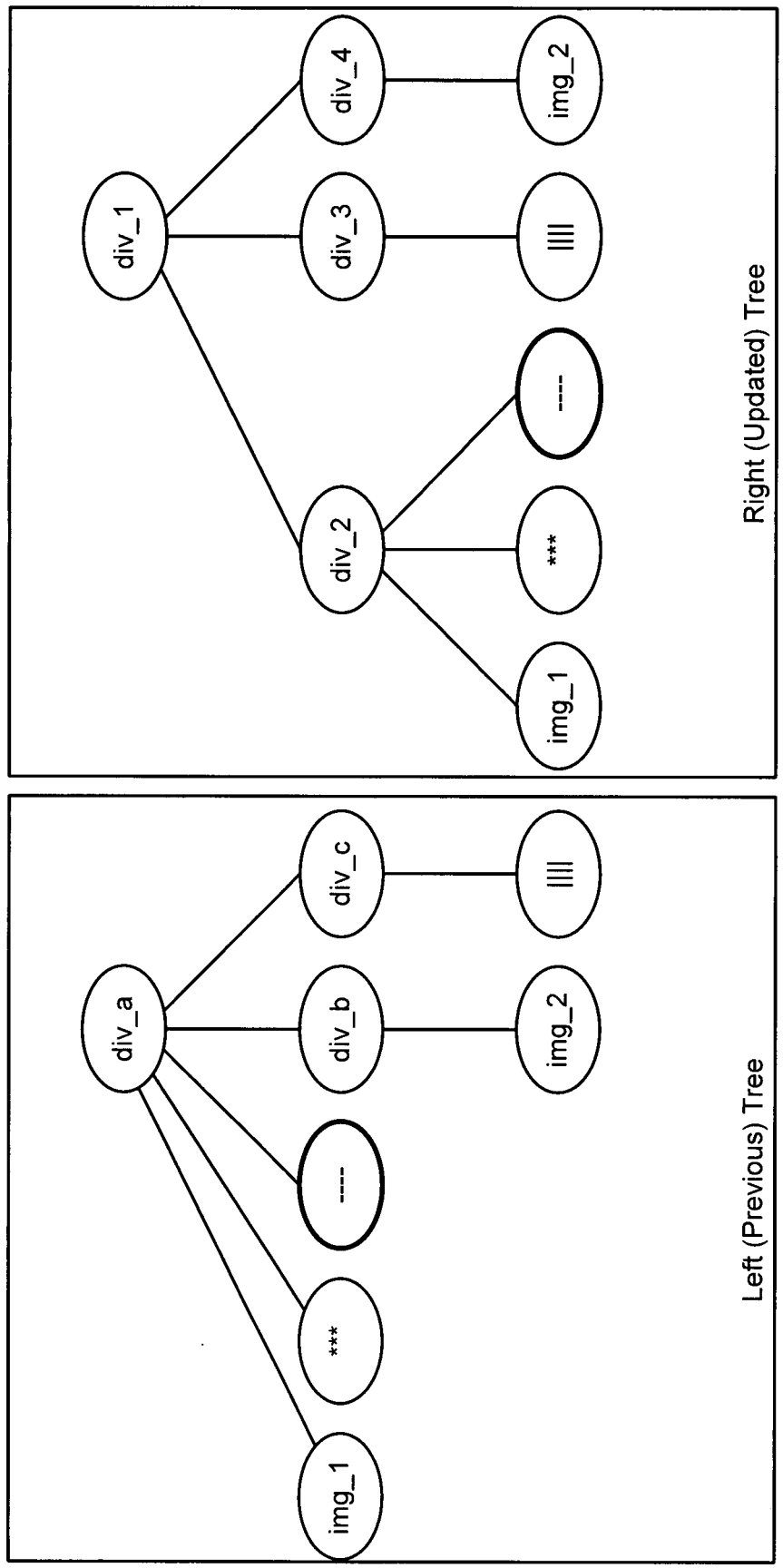
FIG. 6 is a representation of an example web page's previous DOM (domain object model) tree structure and its corresponding updated tree structure used for tracking a web page block.

As described above, the layout and content of a page may be represented by a DOM tree. Each HTML page corresponds to a DOM tree, in which tags are represented as internal nodes, while text, images, hyperlinks and the like are represented as the leaf nodes. FIG. 6 represents the DOM trees corresponding to two pages; the right tree is an updated version of the left one. Segments of these pages' HTML code are set forth in the tables below:

| Left (Previous) Tree |
|---|
| <div id="div_a"> |
|   <img src="img_1"/> |
|   <p>\*\*\*</p> |
|   <p>----</p> |
|   <div id="div_b"> |
|     <img src="img_2"/> |
|   </div> |
|   <div id="div_c"> |
|     <p>\|\|\|\|</p> |
|   </div> |
| </div> |

| Right (Updated) Tree |
|---|
| <div id="div_1"> |
|   <div id="div_2"> |
|     <img src="img_1"/> |
|     <p>\*\*\*</p> |
|     <p>----</p> |
|   </div> |
|   <div id="div_3"> |
|     <p>\|\|\|\|</p> |
|   </div> |
|   <div id="div_4"> |
|     <img src="img_2"/> |
|   </div> |
| </div> |

Given a DOM tree $T_o$ and its sub-tree $B_o$, when $T_o$ has been updated to $T_e$, a significant problem is to locate the changed (evolved) block $B_e$ in $T_e$ that corresponds to $B_o$. $B_e$ should be unique, if it exists. The node number of a web page may range from several hundred to several thousand, (and in one measurement set averaged 1,171). On average in example measurements, the structure and contents varied 11.4 percent and 81.7 percent hourly, with the variation accumulated to 34.0 percent and 88.5 percent, respectively, (where structure variation stands for the percentage of deleted, newly added and tag-updated nodes over all the nodes, while the contents variation stands for the percentage of content-updated nodes over all the nodes). As can be readily appreciated, a large portion of a page's structure and most of its content may be changed during web page evolution; there is thus a large diversity of web pages and significant changes during a web page's evolution.

Simple solutions such as direct path finding, tag string matching, and string edit distance are inadequate. Direct path finding (which records the tags on the path from the root node of $T_o$ to the root node of $B_o$ and looks for different tags on the updated page's path) cannot deal with the problem of block position changing. Tag string matching (which encodes $B_o$ by the tag sequence of its preorder traversal and compares the original tag sequence with the tag sequence of every sub-tree of $T_e$) often fails because there may be several blocks that are similar to the original one; further, it flattens the tree structure into a sequence and thereby loses useful information which significantly decreases the precision. String edit distance is not suitable for this problem as it does not consider the tree structure.

The various aspects described herein use the tree structure and labeled tree mapping for block tracking. Through the mapping between the DOM trees of pages, the corresponding set of nodes between two trees is obtained.

To this end, as used herein, a "labeled tree" is a tree having a label attached to each of its nodes. A DOM tree of a web page may be transformed into a labeled tree by regarding its tags as labels. Then, if $T[i]$ is the $i^{th}$ node of a labeled tree T in a preorder walk, and $l[r]$ is the label of node r, a mapping M between two labeled trees T and T' is a set of pairs $(i, j)$, one from each tree, satisfying the following conditions for all $(i_1, j_1)$, $(i_2, j_2) \in M$:

(1) $i_1 = i_2$ if $j_1 = j_2$;

(2) $T[i_1]$ is an ancestor of $T[i_2]$ if $T'[j_1]$ is an ancestor of $T'[j_2]$.

(3) $l[T[i_1]] = l[T'[j_1]]$, $l[T[i_2]] = l[T'[j_2]]$

As can be seen, the above conditions require that each node cannot appear more than once in a mapping. The hierarchical relation among the nodes is also preserved. There are typically many possible mappings that can be computed between two labeled trees. To evaluate the mapping quality, an edit distance mechanism is used.

More particularly, the edit distance between two trees T and T' is the number of unmapped nodes in the two trees. In this example, edit distance differs from that described above because edit distance reflects the cost associated with the minimal set of operations required to transform T into T'. By finding a mapping with a minimum edit distance, the evolved block may be attained.

Although finding such a mapping between labeled trees is an NP-Complete problem, the mapping finding problem can be solved efficiently by a restriction on the order of nodes. Note that elements of web page DOM trees are ordered, where an ordered tree is a tree with the children of each node ordered.

If $T[i]$ is the $i^{th}$ node of an ordered labeled tree T in a preorder walk, and $l[r]$ is the label of a node r, a mapping M between an ordered labeled tree T of size $n_1$ and an ordered labeled tree T' of size $n_2$ is a set of pairs $(i, j)$, one from each tree, satisfying the following conditions for all $(i_1, j_1)$, $(i_2, j_2) \in M$:

(1) $i_1 = i_2$ if $j_1 = j_2$;

(2) $T[i_1]$ is an ancestor of $T[i_2]$ if $T'[j_1]$ is an ancestor of $T'[j_2]$.

(3) $l[T[i_1]] = l[T'[j_1]]$, $l[T[i_2]] = l[T'[j_2]]$ (4) $T[i_1]$ is on the left of $T[i_2]$ if $T'[j_1]$ is on the left of $T'[j_2]$.

The order between sibling nodes is preserved in the mapping of ordered labeled trees as a supplement of the preservation of the hierarchical relationships.

The tree mapping algorithm minimizes the edit distance between the new DOM tree and the original one, in order to find a target node in the new tree. If t and t' are the root nodes of trees T and T', respectively, n(T) stands for the number of nodes in T. The edit distance is recursively accumulated by the number of unmapped nodes in the two trees as follows:

Condition 1: For the nodes in T that are not mapped to a node in T':

$$Dis(T,T')=n(T)+n(T')$$

Intuitively, the edit distance of unmapped sub-trees is the total number of their nodes.

Figure 7:
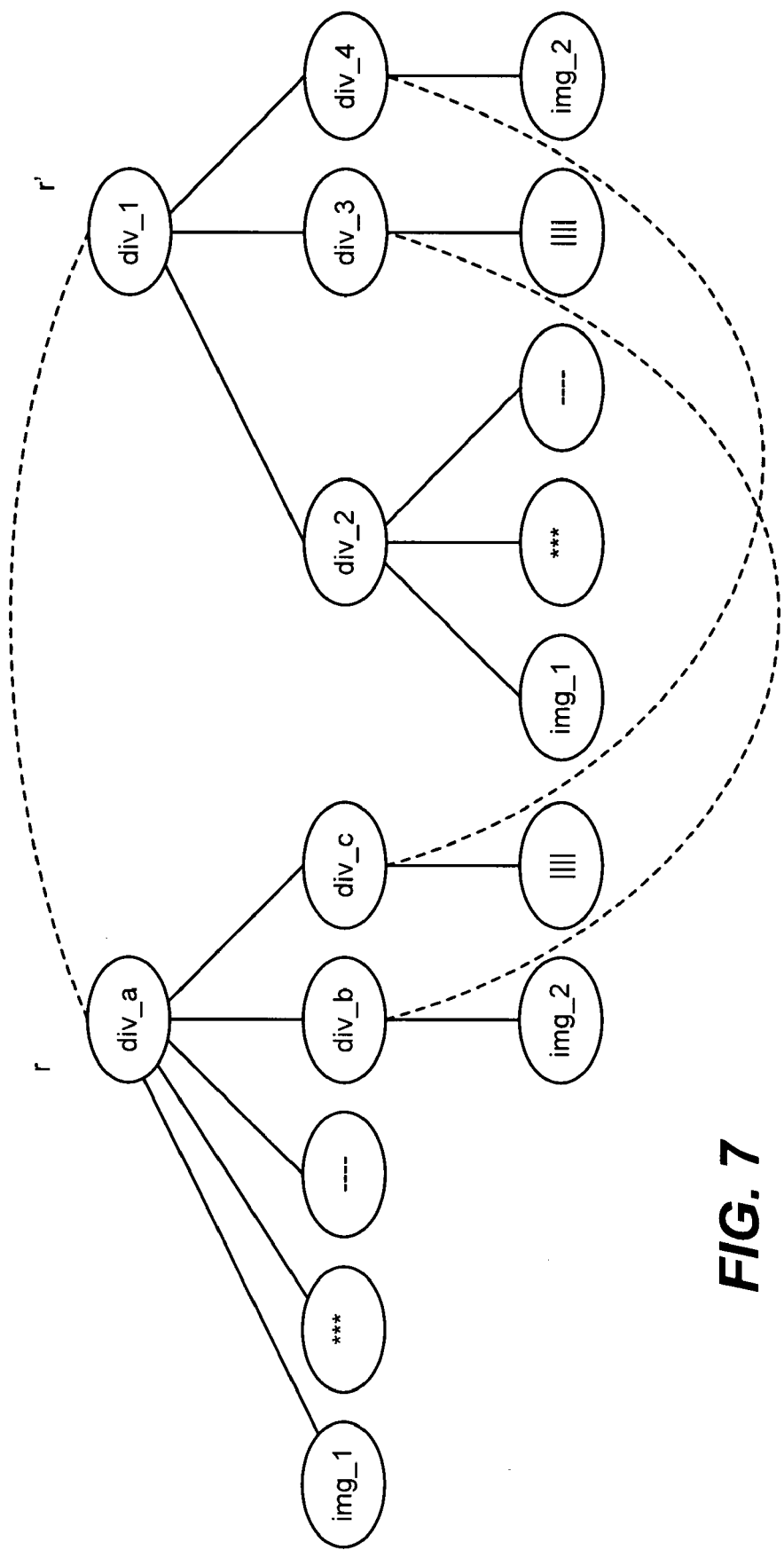
FIG. 7 is a representation of an example tree matching process using an example edit distance calculation.

Condition 2: If r is mapped to r', the edit distance is the total number of the two trees minus the matched nodes. It is assumed that $p_i$ and $p_i'$ are monotonically increasing, so that a standard dynamic programming algorithm can be used to calculate the mapping with minimum edit distance. (FIG. 7 shows an example of tree matching by this Condition 2.)

Assuming that there are m pairs $(S_{pi}, S_{pi}')$ of sub-trees mapped, then:

$$Dis(T,T')=n(T)+n(T')-2-\Sigma_{0 \leq i < m}(n(S_{pi})+n(S'_{pi'})-Dis(S_{pi},S'_{pi'}))$$

Figure 8:
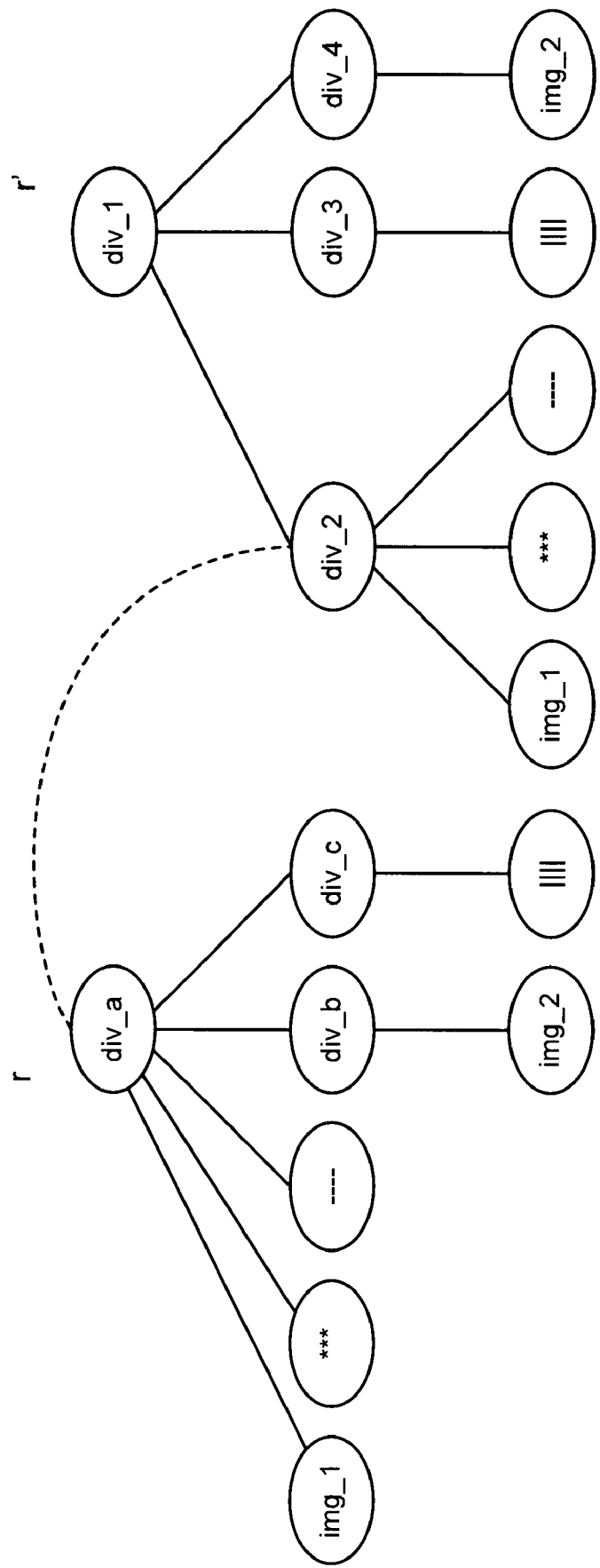
FIG. 8 is a representation of an example tree matching process using an alternative example edit distance calculation.

Condition 3: If r is mapped to the root node s' of sub-tree S' in T', the edit distance of the two trees is the edit distance of T and S' in addition with the unmatched nodes in T'. FIG. 8 shows an example of tree matching by this Condition 3:

$$Dis(T,T')=n(T)-n(S')+Dis(T,S')$$

The edit distance Dis(T,T') is well defined recursively. This algorithm, set forth in the table below, calculates the minimum edit distance. A counterpart mapping can be use a similar process.

```
Int Dis(T, T') {
    r ← root of T;
    r' ← root of T';
    S1, S2...Sx ← the sub-trees of T;
    S1', S2'...Sy' ← the sub-trees of T';
    //case 1
    minDis ← n(T) + n(T')
    //case 2
    if (r.tag( ) == r'.tag( )) {
        childrenDis[0][0] ← 0;
        for (i=0; i<=x; i++)
            for(j=0; j<=y; j++)
                if(i>0 || j>0) {
                    childrenDis[i][j] ← min;
                    Dis(Si, S'j) + childrenDis[i-1][j-1],
                    childrenDis[i][j-1],
                    childrenDis[i-1][j]
                    );
                }
        if (childrenDis[m][n] < minDis)
            minDis ← childrenDis[m][n];
    }
    //case 3
    for (i=0; i<=x; i++) {
        if (Dis(Si, T') + (n(T) – n(Si)) < minDis)
            minDis ← Dis(Si, T') + (n(T) – n(Si));
    }
    for (j=0; j<=y; j++) {
        if (Dis(T, Sj') + (n(T') – n(S'j)) < minDis)
            minDis ← Dis(T, Sj') + (n(T') – n(S'j));
    }
    return minDis;
}
```

A drawback to the above algorithm is its high computational cost with full tree processing. The time complexity of this algorithm is $O(N^2 D^2)$, where N is max(n(T),n(T')) and D is maximum children number of tree nodes. Given contemporary processing power and web pages, users may need to wait on the order of minutes to get the mapping results for large web pages.

To reduce the computational time, an aspect referred to as fixed sub-tree based tracking is described herein. More particularly, although in web pages, layout information is ordinarily more immutable than page content, in page content there are often some tag attributes that are unchanged during a page update, including captions of small blocks, some hyperlinks and some images. With the help of these immutable elements, some sub-trees can be pruned away into a reduced tree. By performing the above algorithm on the reduced tree, the total time cost is often be greatly reduced.

To this end, a fix node and common sub-tree are described, in which a fix node is a node with both a tag and attributes that are immutable in the two trees. In one example implementation, an extra restriction may specify that the content word length of a fix node will be no more than two. A common sub-tree pair is a sub-tree pair which satisfies the condition that the sub-tree roots are the same fix nodes, or the two sub-trees contain a same set of fix nodes, and none of their sub-trees contain all the fix nodes. For example, in FIG. 8, div_b and div_4 is a common sub-tree pair, but div_a and div_2 are not, because the fix node "img_2" is not included in div_2. A minimum common sub-tree is the common sub-tree with minimum size.

To find the fix nodes, the tags and contents of the nodes in the original tree are indexed, for example in a binary tree. Duplicated nodes, comprising those having the same tag and contents, are removed. Second, for the updated web page tree, nodes are sequentially checked, to select the nodes whose content appears in the original (previous) tree. Because the index of the nodes are built in advance, the time complexity of this step is O((N+M)log N), where N and M are the size of the two trees, respectively. Note that if the nodes are indexed by a hash table, the time complexity of this step is O(N+M), at the cost of some extra memory. Note that either way is relatively minor in terms of time cost.

To generate a reduced tree, only a subset of the nodes in the minimum common sub-tree that contains the tracking block (the reduced tree) is considered in the mapping phase. The ancestors and sibling-trees of the minimum common sub-tree are cut off, as mapping between them is unnecessary. To this end, the reduced tree is built by finding the minimum common tree pair that contains the tracking blocks, e.g., using the algorithm set forth in the table below:

```
TreePair findMinCommonTree( ) {
    S ← the traced block;
    Fn ← the set of Fix Nodes;
    while (S != T && S ∉ Fn) {
        //two Fix Nodes' lowest common ancestor
        if (S has more than two sub-trees
            which have Fix Node)
            break;
        S ← S's direct super tree;
    }
    if (S = T) return ( <T,T'> );
    if (S ∈ Fn){
        S' ← corresponding Fix Node in T'
        return ( <S,S'> );
    }
    Fn(S) ← the set of Fix Nodes in S;
    S' ← (T')'s lowest sub-tree
                which contains Fn(S);
    Fn(S') ← the set of Fix Nodes in S';
    While (Fn(S) != Fn(S') ){
        if (Fn(S') ⊇ Fn(S) ){
            S ← S's direct super tree
            Fn(S) ← the set of Fix Nodes in S;
        }
        else {
```

```
    S' ← The direct super tree of S'
    Fn(S') ← the set of Fix Nodes in S';
    }
}
return ( <S,S'> );
}
```

After the minimum common tree pair is found, the algorithm then prunes away some sub-trees in a rule-based fashion, namely those that are not necessary to be taken into consideration in the matching phase. To this end, for each fixed node, its ancestor nodes, except for the nodes that lie in the path from the root to the tracking block, are cut off. In the pruning process, the nodes from the root to the tracking block as well as the successors are preserved, because they are useful in the matching phase. With respect to mapping the reduced trees, because the scale of the DOM trees has been greatly reduced, only the remaining nodes in the minimum common sub-tree are taken into consideration in this phase, using the minimum edit distance algorithm set forth above.

Figure 9:
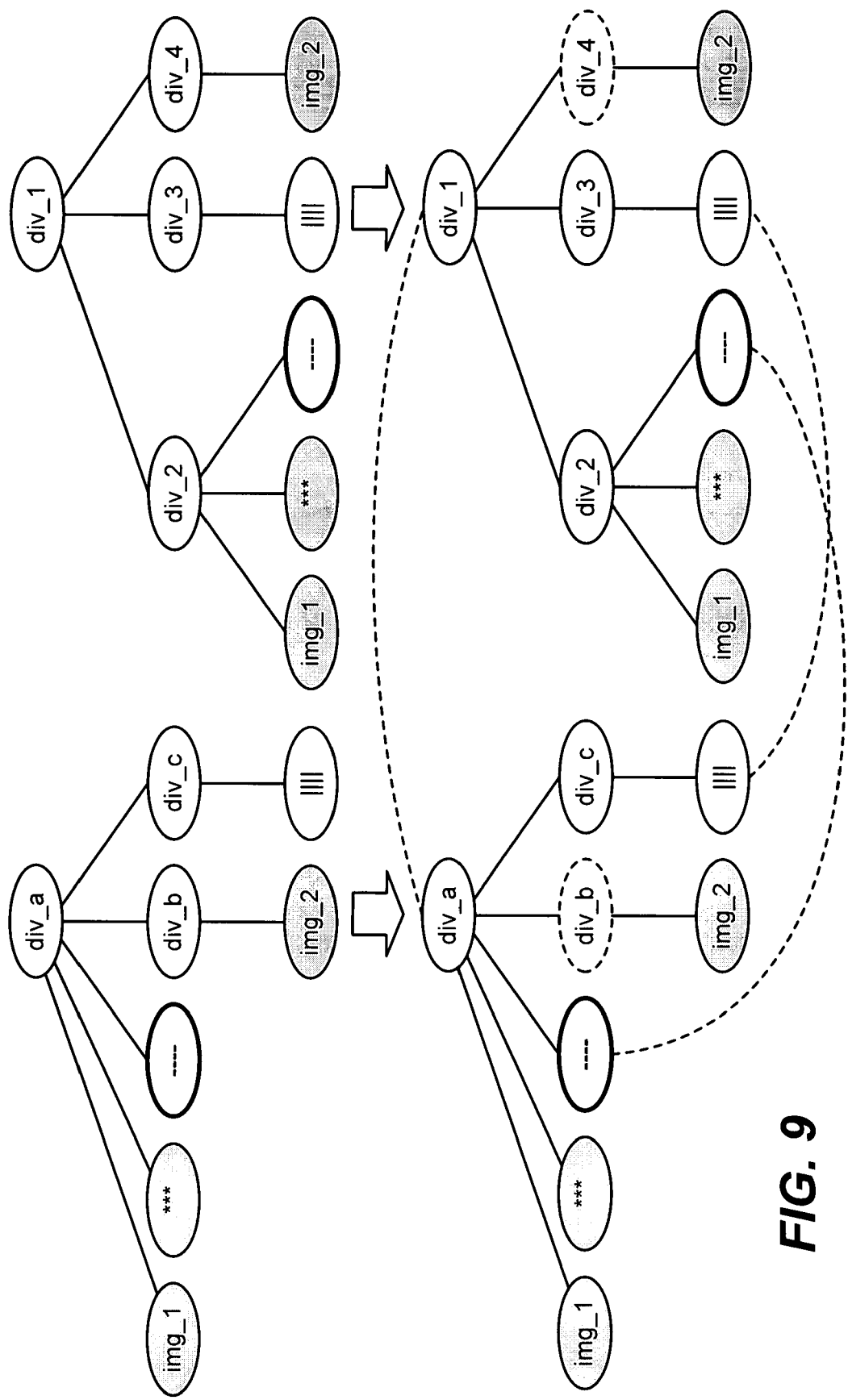
FIG. 9 is a representation of an example fixed sub-tree based tracking process for tracking a block.

FIG. 9 represents an illustration of fixed sub-tree based tracking. The block tracking mechanism 108 marks the block with a bold circle in the left tree and wants to track the corresponding nodes in the right tree. In a first step, the block tracking mechanism 108 picks out fix nodes, which are marked in FIG. 9 as shaded. In a second step, the block tracking mechanism 108 finds the minimum common sub-tree pair. In this case, it is the pair of two whole trees. Then, the block tracking mechanism 108 cuts off the paths containing fix nodes. The pruned nodes are represented by the dashed line in the bottom part of FIG. 9. As a result, there are only four nodes in each reduced tree. Thereafter, the block tracking mechanism 108 performs the minimum edit distance algorithm on the reduced tree set to find the target block.

In sum, the mechanism tracks selected blocks on different web pages for rendering in a single display. The mechanism uses tree edit distance to track the block when the page is updated. By exploiting the immutable elements of web pages, the time complexity and space complexity is significantly decreased. When given two web pages, that is, a previous page and an updated version, the immutable nodes in each DOM tree are recognized. Then, the DOM trees are pruned into a reduced tree by removing the unchanged nodes. A fast tree matching algorithm is then applied to track the target block.

Figure 10:
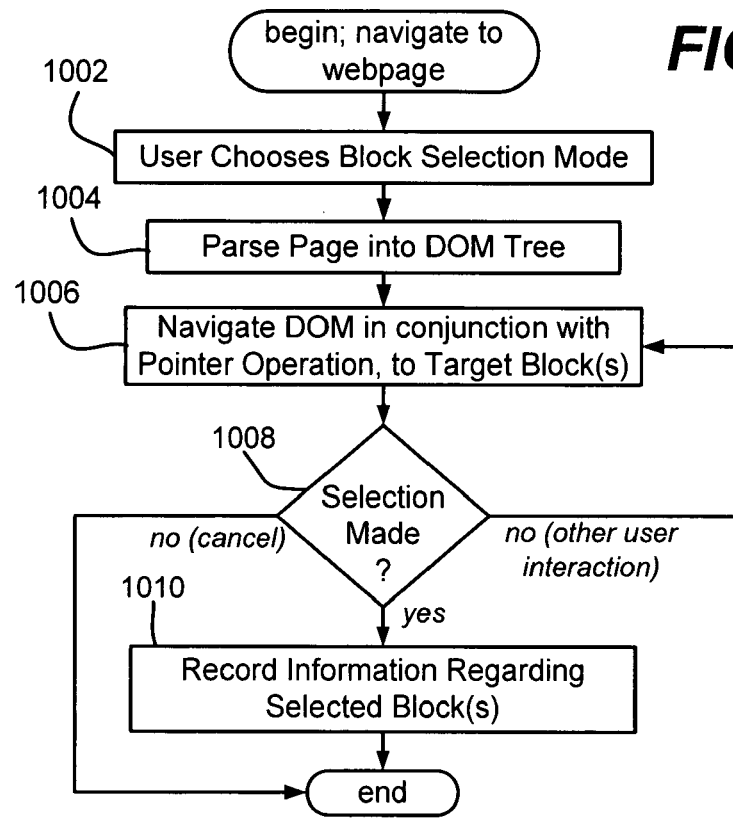
FIG. 10 is a flow diagram representing example steps taken when selecting a block for tracking.
Figure 11:
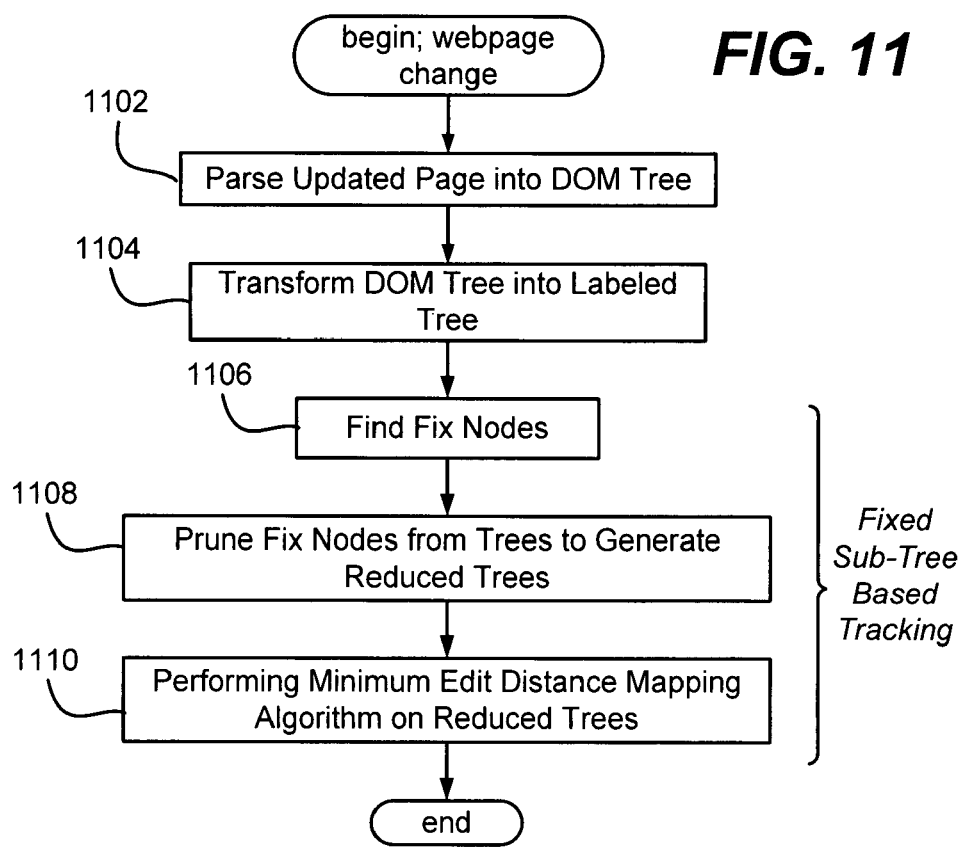
FIG. 11 is a flow diagram representing example steps taken to track a block after its web page is updated.

By way of summary, FIG. 10 represents example steps of the user selection phase of a block, while FIG. 11 represents example steps for tracking a block. In FIG. 10, a user that has navigated to a web page enters a block selection mode at step 1002, such as via a browser toolbar. At step 1004, the page is parsed into a DOM tree of nodes representing that page's blocks (if not already parsed).

As the user interacts with blocks of the page as described above, e.g., via mouse movements and clicks, at step 1006 a block (corresponding to one or more nodes) are recognized via the data in the DOM structure, and denoted in some way to the user to indicate its being targeted. Step 1008 waits for a selection, a canceling of the operation, or further user interaction directed to targeting another block. If a selection is made, step 1010 records the information (in the DOM) needed to track the block against subsequent updates to the block as the page is updated.

To track a block, such as when a personalized home page is rendered, and/or on some automatic time- and/or other event-driven basis, step 1102 parses the web page into a DOM tree. Step 1104 transforms the DOM tree into a labeled tree; note that the prior DOM tree that contained the prior block may have been recorded as a labeled tree, but if not, may also be transformed into a labeled tree at this time.

Steps 1106, 1108 and 1110 represent the overall process of fixed sub-tree based tracking. Step 1106 represents finding the fix nodes; step 1108 represents pruning away the fix nodes to generate reduced trees; and step 1110 represents performing the minimum edit distance mapping algorithm on the reduced trees. As described above, the fixed sub-tree based tracking process reduces the uncertainty of tree mapping by eliminating some definitely mapped nodes. As a result, the time complexity is reduced, and the precision is improved.

Turning to a description of one example implementation, the block tracking mechanism may be provided as a gadget in a local component (e.g., of Internet Information Services, or IIS) of a user's personal computer. The gadget may be invoked in some way, such as automatically triggered upon visiting a particular website (e.g., http://www.live.com), or by the user in some other manner, such as by selecting a home-page via a browser.

In an example implementation, a tracked block in a web page W (where web page W is a content web page where the block exists) may be shown in the gadget's user interface by nesting HTML iframes. More particularly, because the security policy of browsers (e.g., Internet Explorer) prevents visiting pages in an IFRAME from different domains, additional pages may be used to show the correct page and correct block. In one example, the pages are named "url.html" and "block.html". The page "url.html" is composed of a large iframe, with the web page W nested in it. The page "block.html" also contains an iframe, in which "url.html" resides. Because "block.html" and "url.html" are in the same domain, "block.html" is able to scroll the "url.html" page. The "block.html" page can scroll "url.html", and because "url.html" contains the web page W, "block.html" can indirectly orient the block in the web page W.

Exemplary Operating Environment

Figure 12:
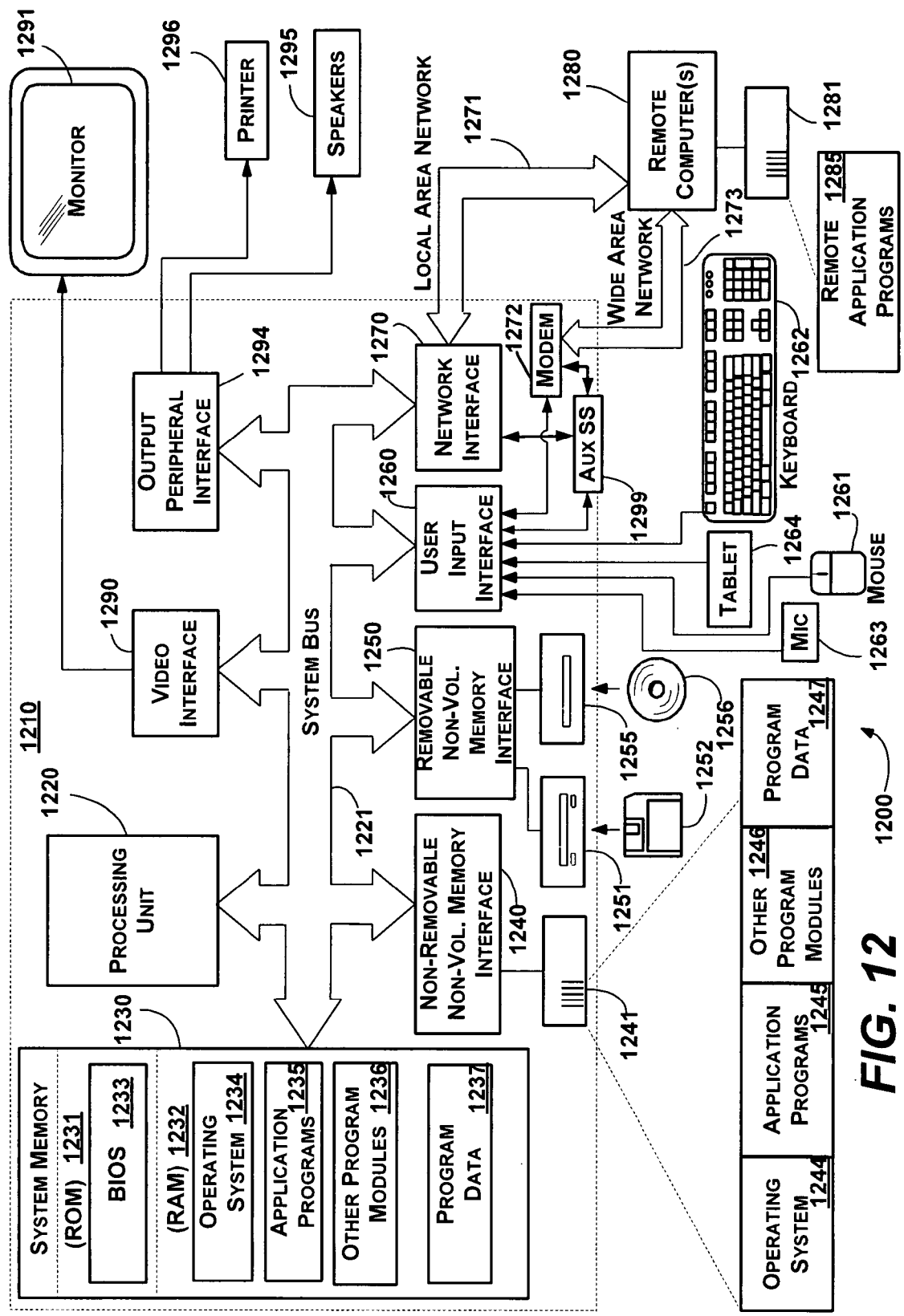
FIG. 12 shows an illustrative example of a general-purpose network computing environment into which various aspects of the present invention may be incorporated.

FIG. 12 illustrates an example of a suitable computing system environment 1200 on which the local components of FIG. 1 may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 12, an exemplary system for implementing various aspects of the invention may include a general purpose computing device in the form of a computer 1210. Components of the computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer-readable media. Computer-readable media can be any available media that can be accessed by the computer 1210 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1210. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236 and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media, described above and illustrated in FIG. 12, provide storage of computer-readable instructions, data structures, program modules and other data for the computer 1210. In FIG. 12, for example, hard disk drive 1241 is illustrated as storing operating system 1244, application programs 1245, other program modules 1246 and program data 1247. Note that these components can either be the same as or different from operating system 1234, application programs 1235, other program modules 1236, and program data 1237. Operating system 1244, application programs 1245, other program modules 1246, and program data 1247 are given different numbers herein to illustrate that, at a minimum, they are different copies. A user may enter commands and information into the computer 1210 through input devices such as a tablet, or electronic digitizer, 1264, a microphone 1263, a keyboard 1262 and pointing device 1261, commonly referred to as mouse, trackball or touch pad. Other input devices not shown in FIG. 12 may include a joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. The monitor 1291 may also be integrated with a touch-screen panel or the like. Note that the monitor and/or touch screen panel can be physically coupled to a housing in which the computing device 1210 is incorporated, such as in a tablet-type personal computer. In addition, computers such as the computing device 1210 may also include other peripheral output devices such as speakers 1295 and printer 1296, which may be connected through an output peripheral interface 1294 or the like.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include one or more local area networks (LAN) 1271 and one or more wide area networks (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260 or other appropriate mechanism. A wireless networking component 1274 such as comprising an interface and antenna may be coupled through a suitable device such as an access point or peer computer to a WAN or LAN. In a networked environment, program modules depicted relative to the computer 1210, or portions thereof, may be stored in the remote memory storage device. By way of example, and not limitation, FIG. 12 illustrates remote application programs 1285 as residing on memory device 1281. It may be appreciated that the network connections shown are exemplary and other means of establishing a communications link between the computers may be used.

An auxiliary subsystem 1299 (e.g., for auxiliary display of content) may be connected via the user interface 1260 to allow data such as program content, system status and event notifications to be provided to the user, even if the main portions of the computer system are in a low power state. The auxiliary subsystem 1299 may be connected to the modem 1272 and/or network interface 1270 to allow communication between these systems while the main processing unit 1220 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    recording information corresponding to a selected block of a web page; and
    using the information to track the selected block for updates, including locating the selected block by processing a data structure corresponding to an updated version of the web page by parsing the updated version into a domain object model tree, and transforming the domain object model tree into a labeled tree and by processing another data structure corresponding to a previous version of the web page, wherein the processing further includes performing a minimum distance mapping algorithm on the data structure and the another data structure, and wherein the processing comprises finding fix nodes in the data structure and the another data structure, and pruning the fix nodes to generate reduced trees from the labeled tree.

2. The method of claim 1 further comprising, receiving the information based on user navigation of the web page relative to the data structure parsed from the web page, including entering a block selection mode that visibly indicates a targeted block corresponding to at least one node in the data structure, allows user interaction to change the targeted block, and allows user interaction to select the targeted block as the selected block.

3. The method of claim 1 further comprising, including the selected block in a set of blocks corresponding to a personalized web page.

4. The method of claim 1 wherein the user interaction selects the selected block corresponding to a node and at least one parent node of that node in the data structure as the selected block.

5. The method of claim 1 wherein the user interaction selects the selected block corresponding to a node and at least one child node of that node in the data structure as the selected block.

6. The method of claim 1 wherein processing the data structure further includes performing a minimum distance mapping algorithm on the reduced trees.

7. In a computing environment, a system comprising:
    a block selection mechanism including a user interface by which a block of a web page is selected and information is recorded for that selected block; and
    a block tracking mechanism configured to locate the selected block on the web page based on the recorded information, including when the selected block is updated on an updated version of the web page with respect to content or layout, or both content and layout, wherein the information is maintained in a first data structure corresponding to a previous version of the web page and a second data structure corresponding to the undated version of the web page, and wherein the block tracking mechanism includes means for finding fix nodes in the first and second data structure, means for pruning the fix nodes from the first and second data structure to generate reduced trees, and means for performing a minimum distance mapping algorithm on the reduced trees to find the selected block.

8. The system of claim 7l wherein the block selection mechanism is activated in response to user interaction with a browser toolbar.

9. The system of claim 7 wherein the block tracking mechanism comprises a daemon program that automatically tracks the selected block.

10. The system of claim 7 wherein the block tracking mechanism updates a gadget comprising a local component on a user computing device.

11. The system of claim 10 wherein the gadget is invoked by browsing to a particular web page, including showing an updated version of the selected block on a personalized web page that contains the selected block.

12. The system of claim 10 wherein the gadget includes at least two pages, including a first page comprising a first iframe having the web page corresponding to the block nested in it, and a second page containing a second iframe with the first iframe within the second iframe, the first and second pages in a same domain.

13. A computer-readable storage medium having computer executable instructions, which when executed perform steps, comprising:
    maintaining information corresponding to blocks of at least two different web pages; and
    generating a personalized web page containing the blocks, including using the information to track the blocks in their respective individual web pages after updates to individual web pages, by processing a data structure corresponding to an updated version of an individual web page in conjunction with another data structure corresponding to a previous version of the individual web page to locate an individual block for the individual web page at least in part by performing a minimum distance mapping algorithm on the data structure and the another data structure, wherein the processing includes parsing the undated version into a domain object model tree, and transforming the domain object model tree into a labeled tree, finding fix nodes in the data structure and the another data structure, and pruning the fix nodes from the data structure and the another data structure to generate reduced trees.

14. The computer-readable storage medium of claim 13 having further computer-executable instructions, comprising, receiving the information for the individual block based on user interaction with the individual web page containing the individual block via a block selection tool, and organizing the blocks on the personalized web page based on user interaction via an organizing tool.

* * * * *